United States Patent [19]
Sonty et al.

[11] Patent Number: 5,499,357
[45] Date of Patent: Mar. 12, 1996

[54] PROCESS FOR CONFIGURATION MANAGEMENT

[75] Inventors: Atashi C. Sonty, Pittsford; Jose A. Faria; Alan W. Willett, both of Rochester; Kim P. Ciulla, Honcoye Falls; Christopher Comparetta, Pittsford; Jack T. Latone, Rochester, all of N.Y.

[73] Assignee: Xerox Corporation, Stamford, Conn.

[21] Appl. No.: 293,258

[22] Filed: Aug. 19, 1994

Related U.S. Application Data

[63] Continuation of Ser. No. 68,336, May 28, 1993, abandoned.

[51] Int. Cl.$^6$ .......................................... G06F 7/20
[52] U.S. Cl. .......................... 395/500; 395/600; 395/700; 364/DIG. 1
[58] Field of Search ................................. 395/500, 600, 395/200, 700, 325

[56] References Cited

U.S. PATENT DOCUMENTS

| | | | |
|---|---|---|---|
| 4,195,344 | 3/1980 | Yamazaki | 395/325 |
| 4,558,413 | 12/1985 | Schmidt | 395/600 |
| 4,763,242 | 8/1988 | Lee et al. | 395/500 |
| 4,827,411 | 5/1989 | Arrowood et al. | 395/600 |
| 4,979,106 | 12/1990 | Schneider | 395/700 |
| 5,019,963 | 5/1991 | Alderson et al. | 395/600 |
| 5,109,486 | 4/1992 | Seymour | 395/200 |
| 5,155,847 | 10/1992 | Kirovac et al. | 395/600 |
| 5,220,668 | 6/1993 | Bullis | 395/650 |
| 5,247,683 | 9/1993 | Holmes et al. | 395/700 |
| 5,274,630 | 12/1993 | Jestice et al. | 370/58.1 |
| 5,289,372 | 2/1994 | Guthrie et al. | 364/403 |
| 5,339,435 | 8/1994 | Lubkin et al. | 395/700 |
| 5,357,631 | 10/1994 | Howell et al. | 395/600 |
| 5,381,403 | 1/1995 | Maher et al. | 370/13 |
| 5,408,618 | 4/1995 | Aho et al. | 395/284 |

FOREIGN PATENT DOCUMENTS

0498130A3  8/1992  European Pat. Off. .

OTHER PUBLICATIONS

Bricknell, P. A. "Software development and configuration management in the Cronos distributed operating system," 1988, Proceedings of the Conference of Software Maintanence, pp. 143–147.

"Representing Domain-Dependent Data in An Object-Oriented System", *IBM Technical Disclosure Bulletin*, vol. 34, No. 6, Nov. 1991, pp. 291–300.

"An Information Model for Configuration Management of Switching Network Elements, Using OSI Tools", Gilbert W. Maymon, Belcore (Mar. 1991), pp. 0118–0122.

"The Development of a Configuration Control Tool", Amy J. Murtha, Electronic Systems Group, Westinghouse Electric Corporation (Aug. 1991), pp. 265–268.

"Implementation of a Software Configuration Enviroment", Dr. Bakul Banerjee, Switching Systems Division, Rockwell International Corporation (Jul. 1990) pp. 132–142.

"Configuration & Software Distribution in Maintenance Environments on Heterogeneous Platforms", Claudia Perin, Olivetti Information Systems (Aug. 1991), pp. 269–274.

"Cooperation and Configuration Within Distributed Systems Management", G. Dean et al, Computing Department, Lancaster University (Mar. 1992), pp. 274–285.

Primary Examiner—Parshotam S. Lall
Assistant Examiner—Viet Vu
Attorney, Agent, or Firm—Oliff & Berridge

[57] ABSTRACT

In a process for ensuring compatibility of components in a system, system components are defined and relationships between two or more system components identified. From relationships between components, inter-relationships between these identified relationships and possibly other components are determined. By validating integrity of either or both of the identified relationship and determined inter-relationship and, based on a validating result, ensuring integrity of the identified relationship or determined inter-relationship, compatibility of the components in the system is ensured. This process is particularly useful in eliminating incompatibilities between resident and migrational software in an automated computer system.

11 Claims, 7 Drawing Sheets

PROCESS FOR CONFIGURATION MANAGEMENT

This is a continuation of application Ser. No. 08/068,336 filed May 28, 1993, now abandoned.

FIELD OF THE INVENTION

The invention relates to a process for ensuring compatibility between components of a computer processing system, particularly for ensuring the integrity of a system configuration, even if enhancements to one system component render it incompatible with another component.

BACKGROUND OF THE INVENTION

Modern industrial manufacturing techniques make use of a known practice of manufacturing products made of many separate components, the components manufactured individually and later assembled into a finished article. This practice permits one component of the article to be modified without substantially altering the entire manufacturing process, and capitalizes on the efficiencies of compartmentalization.

Using such component manufacturing practices, modifications made to a single component to enhance its performance or implement innovative technology not previously available, facilitate continuing product development without compromising production output of an existing product. These component manufacturing practices permeate the information and computer processing industries.

Specifically, with the advent of the computer age, such "component" designs proved essential in developing commercial automated computing systems, which necessarily underwent hardware and software enhancements to capitalize on new, previously undeveloped hardware and software technology. But for the ability of the computer industry to apply these traditional component development practices for larger, complex systems, the rapid, widespread success of the modern computer system would likely not have occurred. Throughout the design, development and implementation of computer systems, maintenance of an operational, yet dynamic, system configuration is instrumental in successfully developing and maintaining a system of integrated data processing components, e.g., central processors, printers, software applications and peripherals. Thus, effective configuration management of these components and their operational relationships between components becomes a vital requirement of the data processing industry.

Early configuration management requirements were satisfied by crude, often error-prone methods. In these early systems, to manage, for example, untested software applications, system engineers generally establish multiple, isolated and separate environments (sometimes on separate disk storage units of a central processor), which are essentially complete, stand alone versions of an entire system application. Enhanced system applications, which often include necessary data "files", are migrated to one or more of these separate "environments", depending on a development step next required. When all components are migrated to an environment and sufficiently tested, a new software "baseline" using a particular environment is established. The "baseline" usually is a result of physically copying relevant data files. The baseline copy is then installed on other existing or new computer systems. Software versions and releases developed by this conventional process are often manually copied by a system operator from tape to disk, or other storage media in file sets from a defined baseline.

Unfortunately, because the design, implementation and testing phases of component development are typically of such long duration, by the time a software release is delivered to a production environment, system changes, occurring during component development necessitate that subsequent changes be manually migrated, independent of a baseline release. As one might expect, as the number of changes increases, complexity of managing the release installation increases proportionally. What should be a simple environment migration (copying of data files) instead, is an involved, labor intensive process to ensure the integrity of a system configuration.

In conventional configuration management, manual installation of modified components to a stabilized configuration demands specialized user knowledge of the configuration. For example, if a software change, applied to a stabilized configuration corrects a problem affecting system operating parameters, the change would not take effect until the processor had been "rebooted." In addition, a component modification, intended to correct one problem, may introduce other errors if improperly installed. Without knowledge of the environment and system configuration, an operator cannot ensure the integrity of a configuration.

Conventional configuration management methods also maintain little historical data on an operating system configuration. Using such methods, debugging errors is difficult. The system does not maintain data establishing which system configuration existed at point of system failure, often making error identification, isolation, recreation and resolution difficult or impossible.

Information system professionals have made numerous attempts to improve and streamline software configuration management. One such effort includes a software tool capable of automated installation or removal of software components from any defined configuration. Although this automated system addresses many of the drawbacks in previous configuration management methods, it is limited to providing a set of written manual instructions and procedures for one of three types of actions: 1) replace a resident file version with a new file version; 2) add new files to the system; and 3) entirely remove resident files from the system, without replacing them with new versions. (See Murtha, Amy J., "The Development of a Configuration Control Tool," Electronic Systems Group, Westinghouse Electric Corporation (August 1991). This automated configuration management system, although facilitating configuration management, functionally only installs and de-installs software files. The system is a file manager and is capable of identifying a file version and acting on a file version based on an SWC ("software change"). The system only maintains information about a specific file related to an SWC and provides no functional information about relationships of the files to other system components (e.g., hardware and operating software).

Other efforts to address problems associated with conventional configuration management have focused on procedures and mechanisms for isolating software development environments. One such proposal, Software Configuration Environment ("SCE") maintenance, involves establishing a set of individual environments, procedures and tools for a specific configuration. In this system, for each product release, one self-contained environment is created per phase and the different phases placed in a horizontal pipeline. Each environment is designed to be a self-contained set of files under control of a Source Code Control Systems (SCCS). See Banerjee, B., "Implementation of a Software Configuration Environment," Switching Systems Division, Rockwell International Corporation (July 1990).

In this system, each product release is designed to be composed of all entities in the corresponding pipeline and each new release is an extension of a previous release. Additionally, two, interconnected databases track user level change requests and problem reports and maintain records of resulting fixes in documents and code.

This configuration management design merely maintains information about an environment dedicated to a specific version or release. It affords no assistance in identifying, validating and verifying integrity of the system's configuration for non-determinative updates to components in a computer processing system. Although it contains information tracking requests for changes to system functions or to correct processing errors in the application logic, once changes are made in one of the many individual environments, a complete new version of all entities in the horizontal pipeline is required. System operators cannot determine whether a new release will result in a product release incompatible with resident software or hardware until after the new release has been dynamically tested by users in that environment. Such a result exposes system developers to allegations of poor testing and development practices and often equates to significant computer downtime.

Although the disclosed software configuration environment eliminates some of the above-mentioned draw backs, it requires that system operators have a detailed knowledge of the functional application to organize and bundle the system packages. In addition, no method for ensuring that all system components are contained in a particular system configuration is provided.

Nor does the disclosed procedure address configuration management of non-determinative replacement, substitution, addition or removal of a component subset of a system configuration. It manages the configuration as a whole unit. In non-determinative configuration management, as is true of conventional methods discussed above, if a change to a single system component requires installation or replacement of a complete copy of the resident software, system maintenance costs rise higher proportionately.

The introduction of networks and decentralized processing environments adds a significant level of complexity to managing system configurations across distributed systems. In distributed architectures, system components are not confined to a single, isolated processing environment. Compatibility of system components and integrity of the environment require verifying compatibility and ensuring integrity across multiple environments running on various processing platforms.

Work station technology, networks and client-server architectures introduce additional complexities in configuration management. The cooperative nature of these distributed system architectures, having multiple remote locations with each location operating independently of another location and having separate system configurations, presented skilled artisans with complex, unresolved configuration management issues.

In an attempt to address these new issues in configuration management, presented by the more contemporary distributed computer processing systems, Dean et al. developed a procedure for classifying areas subject to and amenable to automated computer support. In their distributed system, configuration and structure of the distributed system modeled is described by defining structures, relations and components of a distributed system.

Conceptually, one approach to configuration management in the distributed process environment records and maintains information about a specific distributed configuration, without enforcing rigid configuration control policies. Once the information is recorded, a consistency checker might examine the recorded information to highlight system irregularities. See Dean et al., "Cooperation and Configuration Within Distributed Systems Management," Computing Department, Lancaster University (March 1992).

Such a configuration management system fails to provide a method for maintaining a system environment subject to non-determinative changes in configuration. The disclosed method lacks a process for establishing predetermined dependencies prior to performing any maintenance operation. In the disclosed system, configuration and dependency information is merely recorded and subsequently examined. Before or after system maintenance, integrity of the configuration is not validated.

Another attempt to resolve many of the problems inherent in contemporary heterogeneous platforms addressed disadvantages of multi-dimensional platforms. See Perin, "Configuration & Software Distribution in Maintenance Environments on Heterogeneous Platforms," Olivetti Information Services (August 1991). Perin describes a procedure for maintaining a system operating at various user locations in which the systems have quite different configurations. The procedure establishes a centralized system for identifying, resolving and implementing modifications to an existing application or hardware system. The discussed procedure utilizes conventional methods for managing a defined configuration. Separate established environments contain isolated operating environments for maintenance, testing and release of updated software versions and releases.

Each environment provides a specific set of support functions depending on an intended use for an environment: e.g., 1) developing and testing, 2) testing only or 3) releasing. This procedure provides only for identifying, documenting and resolving errors in a production system. Perin does not discuss a procedure for maintaining the integrity of a system configuration to prevent errors introduced into a user environment during interface of a remote application with a central processor or upgrading/downgrading of a remote location, independent of a shared location.

In yet another configuration management alternative, Maymon discusses a systematic set of modeling tools used in conjunction with object-oriented modeling techniques to identify and classify subscriber service objects managed by a management information base (MIB), operating under a network switching element (NSE). See Mayman, "An Information Model for Configuration Management of Switching Network Elements, Using OSI Tools," Bellcore (March 1991). The memory administration information model presented and discussed in Maymon is a conceptual illustration of groupings of various data elements within the service MIB of the NSE. Mayman discusses a managed object class as an identified grouping of managed objects which share certain characteristics, each class containing a number of attributes whose values define the service profile of each managed object. Composite managed objects result from containment (aggregation) of superior and subordinate managed object classes.

The disclosed tools and techniques define objects required to provide a customer a subscribed-for telecommunication service. The system is limited to defining objects required to provide subscriber services. A disclosed operating system retrieves attribute and other relevant information about the managed objects. The disclosed system is a roadmap for the objects managed by an operating system. If an object managed by the operating system changes, the information model also changes. The disclosed system is not capable of dynamically verifying and ensuring that an object is or is not required to provide a specific service.

SUMMARY OF THE INVENTION

Thus, to overcome the limitations of conventional methods, the inventive process provides a universal process for ensuring the compatibility of components in a system, particularly in systems having many components which undergo non-determinative enhancement. In the inventive process, system components are first defined. After defining relevant system components, compatibility relationships between two or more system components are identified. From these identified compatibility relationships, inter-relationships between at least two compatibility relationships are determined.

The compatibility relationships and inter-relationships may be assigned a dedicated control field, thus uniquely identifying each relationship and inter-relationship identified. Once the relationships and inter-relationships are identified, validating integrity of the compatibility relationship and/or inter-relationship and, based on a validating result, and maintaining integrity of the compatibility relationships and inter-relationships defined, ensure compatibility of system components in a system configuration.

Maintaining integrity of the compatibility may include taking one or more corrective actions to re-establish the integrity of the compatibility relationship or inter-relationship.

DETAILED DESCRIPTION OF PREFERRED EMBODIMENTS

Figure 1:
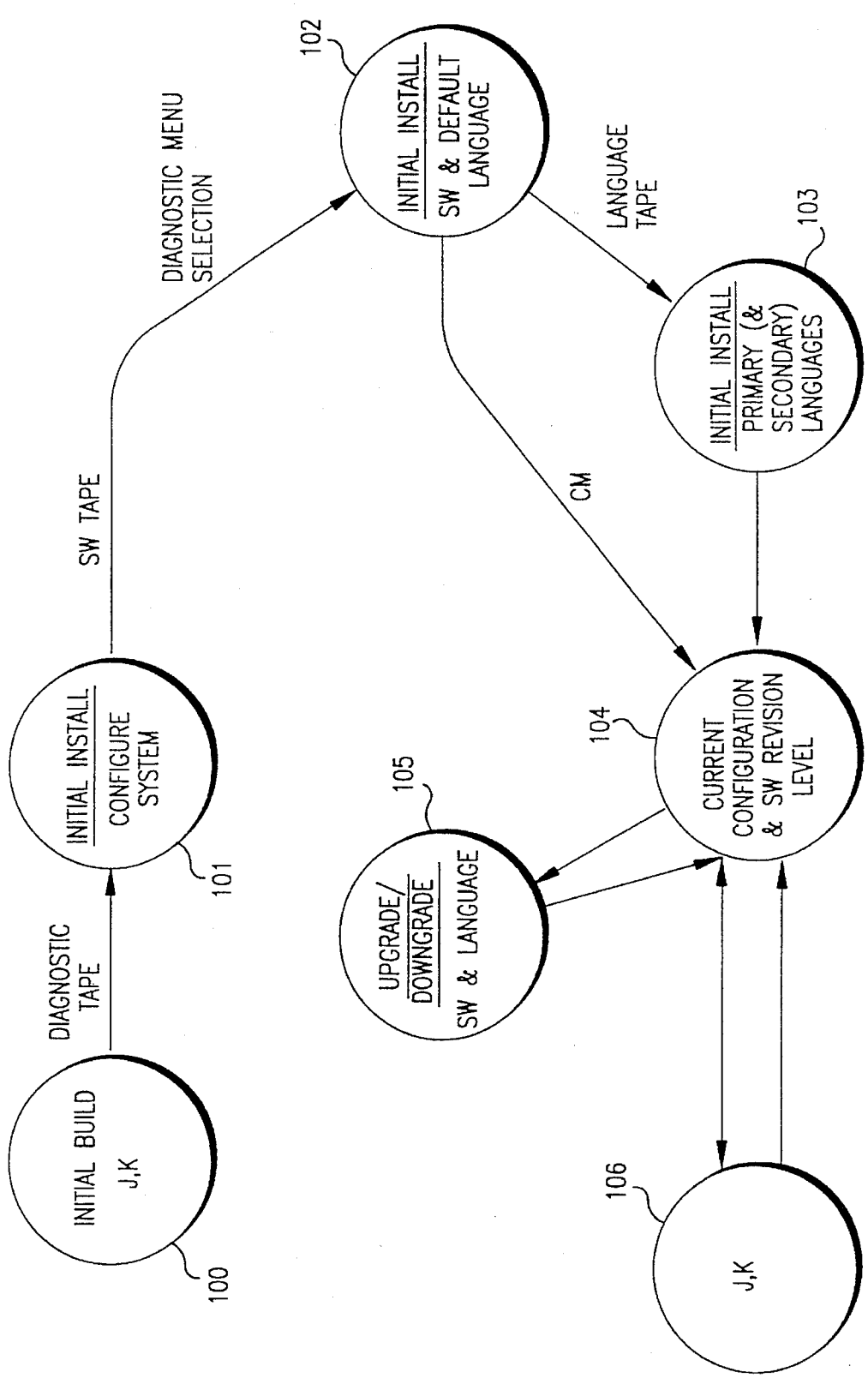
FIG. 1 is a State Diagram in an embodiment of a configuration management system according to the invention.

The present invention addresses and eliminates the drawbacks of conventional configuration management methods for automated computing systems by defining components of the system subject to redesign, modification, removal or replacement in a system to which non-determinative modifications occur. Representative system components may include hardware, software applications and user languages. Once the relevant components are defined, relationships between two or more computing system components are identified. An exemplary relationship might include, but is not limited to, identified compatibility between a software application controlling printing of landscape document images and a particular printer model which provides landscape printing. In this example, the defined components are a 1) software application, and 2) printer. A functional relationship requires that the software application operate a specified landscape option.

Identifying relationships necessarily results in relationships between two or more relationships or between a relationship and one or more components, hereinafter referred to as inter-relationships. Determining inter-relationships in the process according to the invention completes a configuration definition. The defined configuration is a basis for dynamically managing a system configuration.

Managing the configuration includes validating integrity of a relationship or inter-relationship and based on a validating result, maintaining integrity of a defined configuration, having relationships and inter-relationships, and thus ensuring compatibility of system components in the configuration. Configuration maintenance may include, but is not limited to, notifying appropriate system operators of a relationship or inter-relationship inconsistency or taking corrective action to re-establish integrity of the configuration. A representative corrective action may include restoring a specified component to a previous condition or status, upon system detection of an error in a pre-determined relationship.

Ensuring integrity of the defined system configuration may occur at various, pre-selected times. For example, verifying and maintaining defined configuration relationships and inter-relationships may occur when a new system component is installed. Adding a new fixed disk drive requiring enhanced-function operating software exposes a defined system configuration to a potential operating error if the relationship of the components are not verified. Thus, verifying and maintaining the integrity of the configuration is necessary after upgrading the disk drive. Subsequent verification and maintenance checkpoints may be required depending on the significance of the relationship to be validated and impact to the system if a relationship becomes corrupted between checkpoints. Other exemplary opportunities for verification of configuration integrity include 1) after an initial installation of a complete system, 2) installation of one or more components in a system, 3) a partial or complete downgrade of one or more system components (e.g., such as a hardware device or software application) to a previous version of a system component, or 4) a partial or complete upgrade of one or more system components to a later component version.

The process according to the invention is particularly useful when non-determinative changes occur to one or more components in the system, especially when the defined configuration includes components of different versions, and even more so when the components defined to the configuration are different releases.

Many problems of conventional configuration management systems arise because insufficient information is maintained about a defined configuration during operation. The present invention overcomes this drawback of conventional methods, by optionally maintaining status information about the state of a defined configuration during specific periods, between pre-determined checkpoints. In a preferred method for recording such information, maintenance of configuration integrity includes writing data to a computer log. Such information may preferably be utilized in subsequent integrity validations to eliminate redundant validation processing.

A preferred embodiment of the inventive method is useful in eliminating incompatibilities between resident software on the computer system and migration software. This preferred method comprises defining resident software and migrational software components used in the computer system, identifying compatibility relationships between a first resident software and at least one of a second resident software or migrational software and determining compatibility relationships between at least one compatibility inter-relationship and at least one resident software, migrational software or another compatibility relationship. A dedicated control field is assigned to each compatibility inter-relationship or compatibility relationship and stored. Storing the dedicated control field permits subsequent automated retrieval of the control field for use in periodic integrity validation. Then, prior to performing a computer operation, e.g., a hardware reconfiguration, software upgrade or user language redefinition, the integrity of the computer system is validated by identifying system incompatibilities.

Finally, incompatibilities identified in the integrity validation are eliminated. Although alternatives exist for identifying incompatibilities, a preferred method reads migrational software and resident software identification data, verifies compatibility between resident software and migrational software by comparing current configuration data against the dedicated control field, and upon verification, updates current configuration data for the migrational software, now "new" resident software, in the computer system. Preferable computer operations are not limited to migrational software installation, but may include a software upgrade or downgrade.

Integrity validation in which incompatibilities are identified may occur subsequent to performing a computer operation, and in response to an identified incompatibility, integrity of the original configuration may be maintained by restoring prior resident software to a previous, verified configuration.

An embodiment of the present invention is illustrated by the following non-limiting examples:

EXAMPLE 1

In an example of a configuration management system, a commercially available computerized document production facility has a variety of devices and applications, combined in multiple configurations over a range of version levels with a variety of enabled features. In order to ensure proper combination of the hardware, software and other components of the document production system, the configuration management system coordinates proper combination of components, including the version and release levels, against enabled system feature sets.

Figure 3:
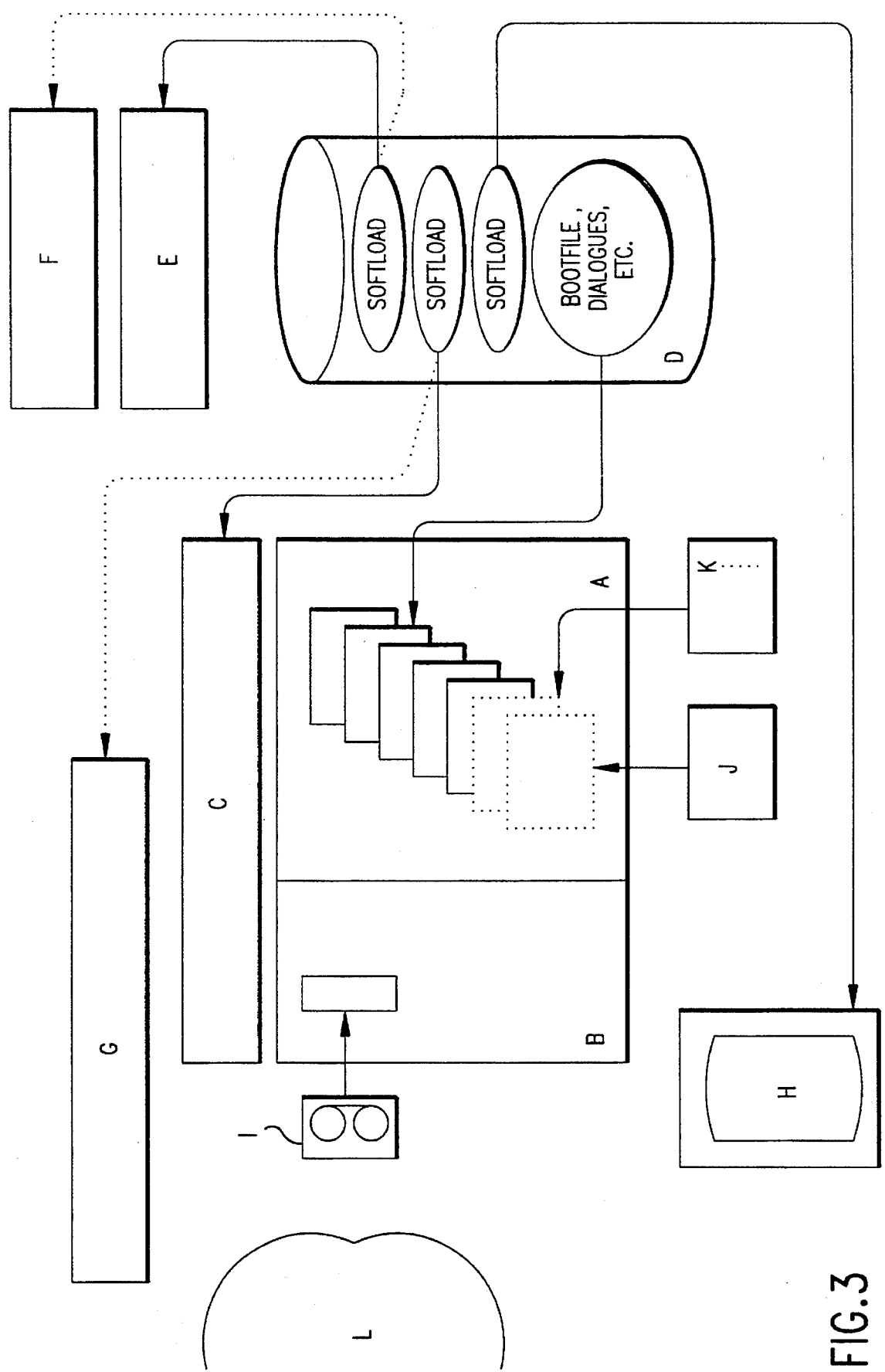
FIG. 3 is a schematic representation of the system architecture for a data processing system using an exemplary configuration management system.

In this example, the document production facility consists of components as represented in FIG. 3. The system core is comprised of a central processor unit (CPU) A. The central processor contains permanent disk storage devices containing operational and other system parameter data, such as data stored in Programmable Read Only Memory Storage (PROMS) J and K. Other data, e.g. boot-up data and operating system logs are stored on disk storage devices in the central processor.

The document production system application, running on the processor invokes one of numerous application modules D stored on devices in the processor. A document scanner G scans external data from documents. Scanned data remains in disk storage managed by the processor. Printing devices E and F are components of the document production facility and may be invoked by specific functions performed by the processor or application modules. Designated application modules D, stored on central processor A provide a user interface H for interfacing with system users.

A tape device B provides for loading and backup of software applications, loading of font data, backup of system information from the processor or loading from a tape I, containing data or software L, to the processor or storage devices.

In the configuration management system for this document production facility, a configuration management state diagram is illustrated by FIG. 1. Prior to an initial installation of the document production system 101, the system parameter files, e.g., J and K, are built, 100. During initial installation, 101, configuration of an electronic sub-system occurs. Upon completion of an initial installation, software applications and default document production facility languages are defined to the system, 102. From a language tape, using tape 1 (FIG. 3), primary and secondary languages are initially loaded onto the central processor, 103.

The installed document production facility becomes the current configuration, having established hardware components, a particular software version and release for installed applications and designated user languages, and is designated as such, 104. Upon obtaining an initially configured system, system PROMS are updated and retain current configuration information for subsequent use in validating integrity of the system configuration, 106.

Figure 2:
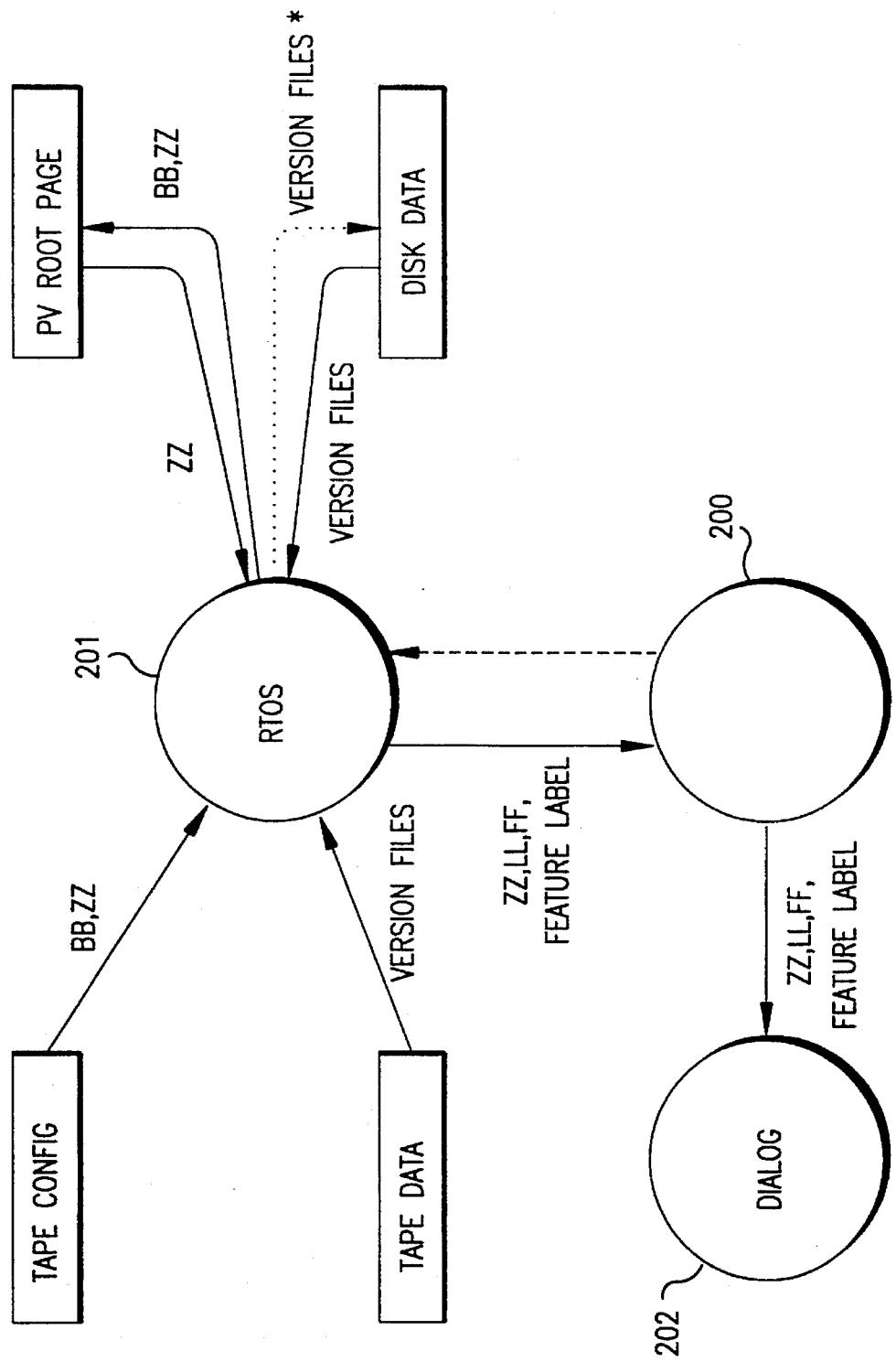
FIG. 2 is a representative high-level process flow diagram for a full software upgrade function.

During the operational life cycle of the illustrated configuration management system, modifications to application software, designated user languages or system hardware necessarily result in system upgrades and downgrades. In the application, CM (configuration management, 200) functions as a controlling module, performing one of various system maintenance operations, e.g., upgrading or downgrading document production system components, FIG. 2. Upon upgrading or downgrading specific system components, the system PROMS are updated by the Real Time Operating System (RTOS), 201, to reflect the modified current configuration along with configuration status output to Dialog, 202. Subsequent to completion of an upgrade or downgrade operation, verification of the environment integrity occurs.

In the exemplary configuration management system, the application CM, illustrated in greater functional detail in FIGS. 4–7, dynamically manages a system configuration throughout the various configuration states which may exist during the life cycle of the document production system. Each system component of a current configuration of the document production facility is recorded on disk storage or PROMS. Relationships and inter-relationships required to verify and maintain the integrity of the system are provided in data fields and/or functional application processing. The data fields are encoded control fields identifying the compatibility of one system component (e.g., software application) with another system component (e.g., printing device). Through functional application processing, or manual validation, integrity of any possible configuration of the components is ensured. Table I illustrates representative relationship and inter-relationship control data fields in the document production facility.

TABLE I

| Date Type | Designation | Storage Location | Description |
|---|---|---|---|
| Product Software Component | | | |
| Configuration | ZZ | CONFIG | Product Family, e.g., 1 = Printer E, 2 = Printer F, etc. |
| SW-Language Compatibility | LL, FF | Textfile | LL increments when language and software items have changes that are not compatible. FF increments when there is a change to a language item which affects the function of the item. |
| SW-Diag Utility Tape Compatibility | BB | CONFIG | Compatibility number for Diagnostic Utility Tape |
| Product SW Feature Level | "50 Characters" | Textfile | Represents the SW Release Level. This is used for visual reference only. |
| Language Feature Level | "50 Characters" | Textfile | Represents the Language Release Level. This is used for visual reference only. |
| Language Component | | | |
| Configuration | zz | CONFIG | Product Family, e.g., 1 = Printer E, 2 = Printer F, etc. |
| SW-Language Compatibility | LL, FF | Textfile | LL increments when language and software items have changes that are not compatible. FF increments when there is a change to a language item which affects the function of the item. |
| Language Feature Level | "50 Characters" | Textfile | Represents the Language Release Level. This is used for visual reference only. |
| Diagnostic Utility Component | | | |
| Configuration | ZZ | CONFIG | Product Family, e.g., 1 = Printer E, 2 = Printer F, etc. |
| SW-Diag Utility Tape Compatibility | BB | CONFIG | Compatibility number for Diagnostic Utility Tape |
| Diagnostic Utility Tape Feature Level | "50 Characters" | Textfile | Represents the Diagnostic Utility Tape Release Level. This is used for visual reference only. |
| Controller Component | | | |
| Configuration | ZZ | PVRootPage | Product Family, e.g., 1 = Printer E, 2 = Printer F, etc. |
| Primary-Language Compatibility | LL, FF | Textfile | LL increments when language and software items have changes that are not compatible. FF increments when there is a change to a language item which affects the function of the item. |
| Secondary-Language Compatibility | LL, GG | Textfile | LL increments when language and software items have changes that are not compatible. GG increments when there is a change to the Secondary language item which affects the function of the item. |
| SW-Diag Utility Tape Compatibility | BB | PVRootPage | Compatibility number for Diagnostic Utility Tape |
| Product SW Feature Level | "50 Characters" | Textfile | Represents the SW Release Level. This is used for visual reference only. |
| Primary Language Feature Level | "50 Characters" | Textfile | Represents the Primary Language Release Level. |
| Secondary Language Feature Level | "50 Characters" | Textfile | Represents the Secondary Language Release Level. |

In Table I, control data fields are identified for respective software, language, diagnostic and controller components in the document production facility. Configuration management control data fields for software applications include a configuration field ZZ, identifying compatibility of the software with a family of products. In this example, this configuration field specifies a code indicating whether a software application is "configured" to interface with a given hardware component (e.g., a particular printer, scanner or user interface).

Similarly, a concatenated SW-Language Compatibility control fields LL, FF contain encoded data indicating whether either a modified designated user language or software application are incompatible. Specifically, data field LL, when incremented, identifies an incompatibility between a modified software item and system language. FF, like LL, when incremented, indicates that a modification to a designated user language is no longer compatible with a software component in the current configuration.

A third control field, SW-Diag Utility Tape Compatibility identifies a specific utility tape which is compatible with the specific modified software. The remaining two data fields store text information used for visual reference to a particular software tape.

Control data fields exist for other system components as illustrated in Table I. However, the number and types of fields may vary, depending upon the number of relationships, inter-relationships and information required about these relationships or inter-relationships to ensure and maintain integrity of a current configuration.

Once the control fields (relationships) are identified to the system and a current configuration of the document production system established, ongoing maintenance of any potential system configuration occurs at predetermined processing points.

Figure 4:
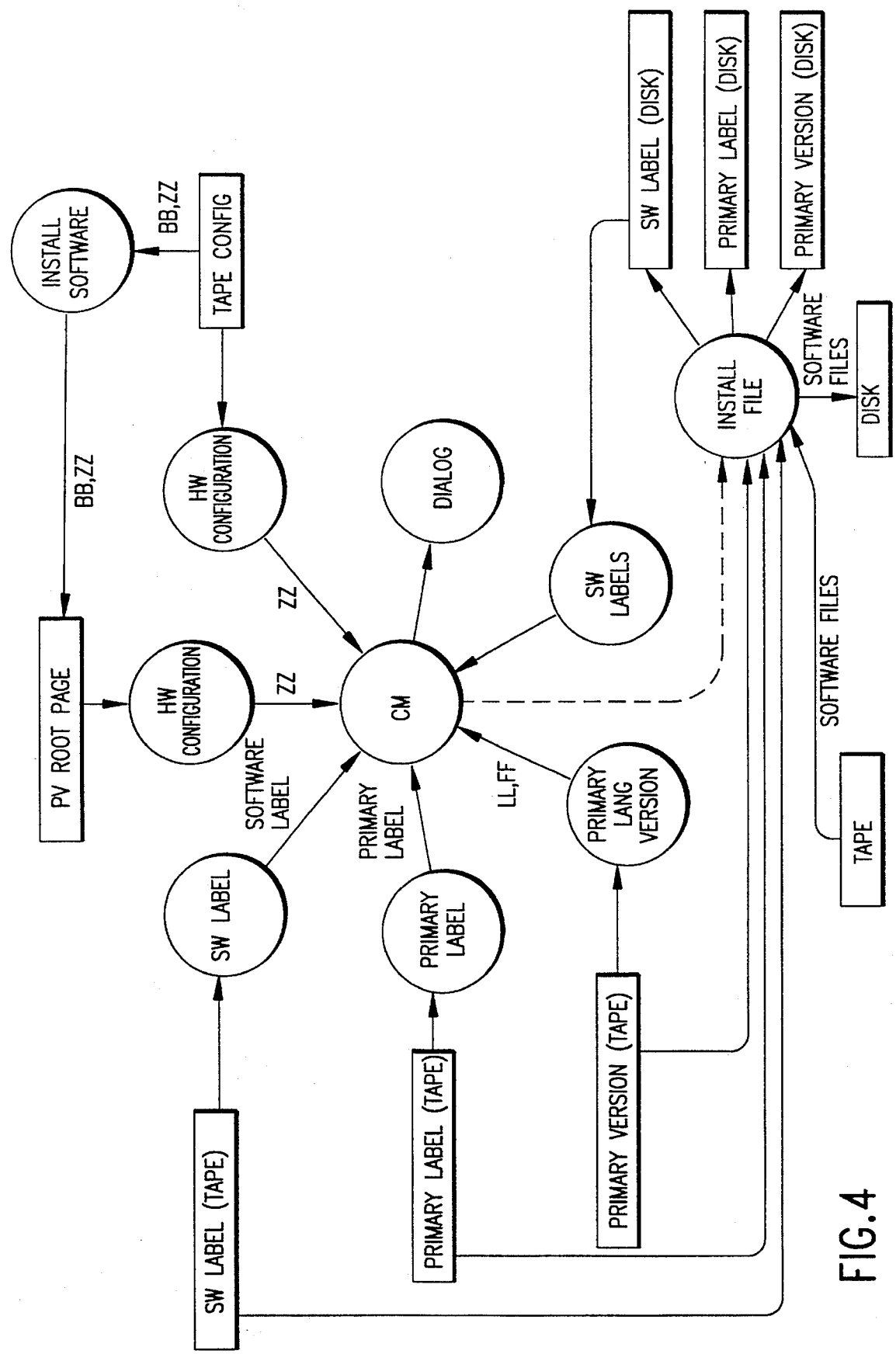
FIG. 4 is a data flow diagram for the configuration management (CM) application, represented in FIG. 2.

FIG. 4 illustrates a configuration management data flow for a full software application upgrade to the document production system. An upgrade may enhance current application functionality or correct deficiencies undetected in a prior software version. The CM application governs data flow through the system. From the tapes SWLabel, PrimaryLabel, PrimaryLangVersion and HWConfiguration, control data fields ZZ, LL and FF and other relevant configuration textual data are retrieved from the text files. This data will be used to subsequently verify the integrity and ensure compatibility of the "upgraded" current system configuration. Hardware configuration information, read from system data stores, is provided to the CM application for interpretation.

Upon analysis of the control data retrieved from application files or read from system data stores, the CM application instructs InstallFile to load the software files from tape I to internal fixed storage (disk) on the CPU A. Simultaneously, InstaliFile updates permanent system files with current configuration control data. A full software upgrade is completed and the integrity of the system is ensured. Upon successful completion of the full software upgrade, the system software label is updated (via SWLabels) and status information, reporting on the integrity of the upgraded current configuration, is provided to users through the system application Dialog (FIG. 4).

EXAMPLE 2

Figure 5:
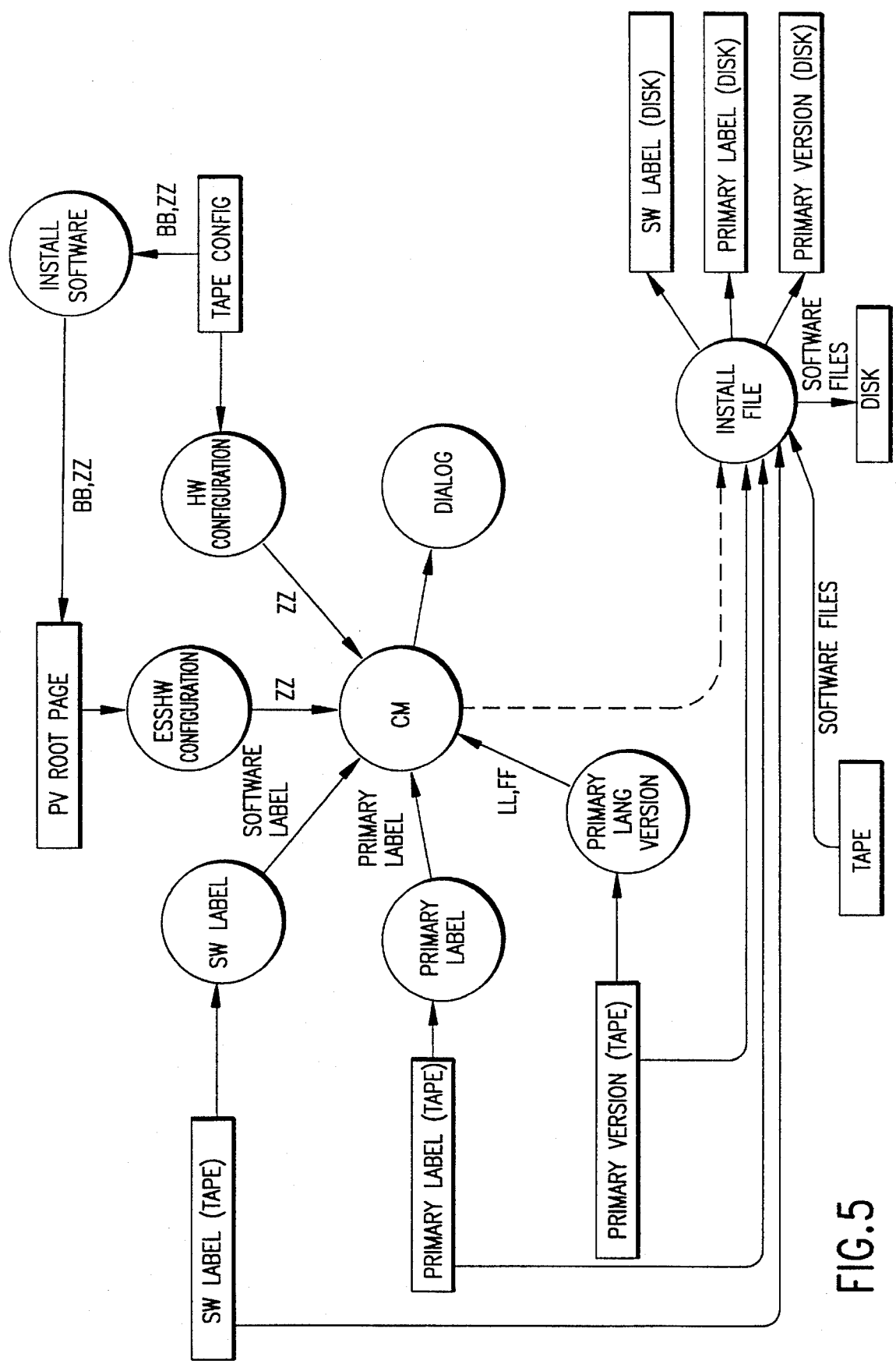
FIG. 5 is a data flow diagram for the CM application for a partial software upgrade.

This example utilizes the functionality of a configuration management system in Example 1 for a partial software upgrade, i.e., only preselected, modified software files are loaded onto the system. FIG. 5 represents a data flow diagram for configuration management of a system partial software upgrade. The sequential data flow of this functional operation corresponds to the data flow for a full software upgrade, with one exception. The process distinctions between a partial and full upgrade reside in the final configuration management processing. In a partial software upgrade, SWLabels, identifying the software resident in the current configuration, is not read by CM for display to Dialog. No change to the system configuration requiring user notification occurs.

EXAMPLE 3

Figure 6:
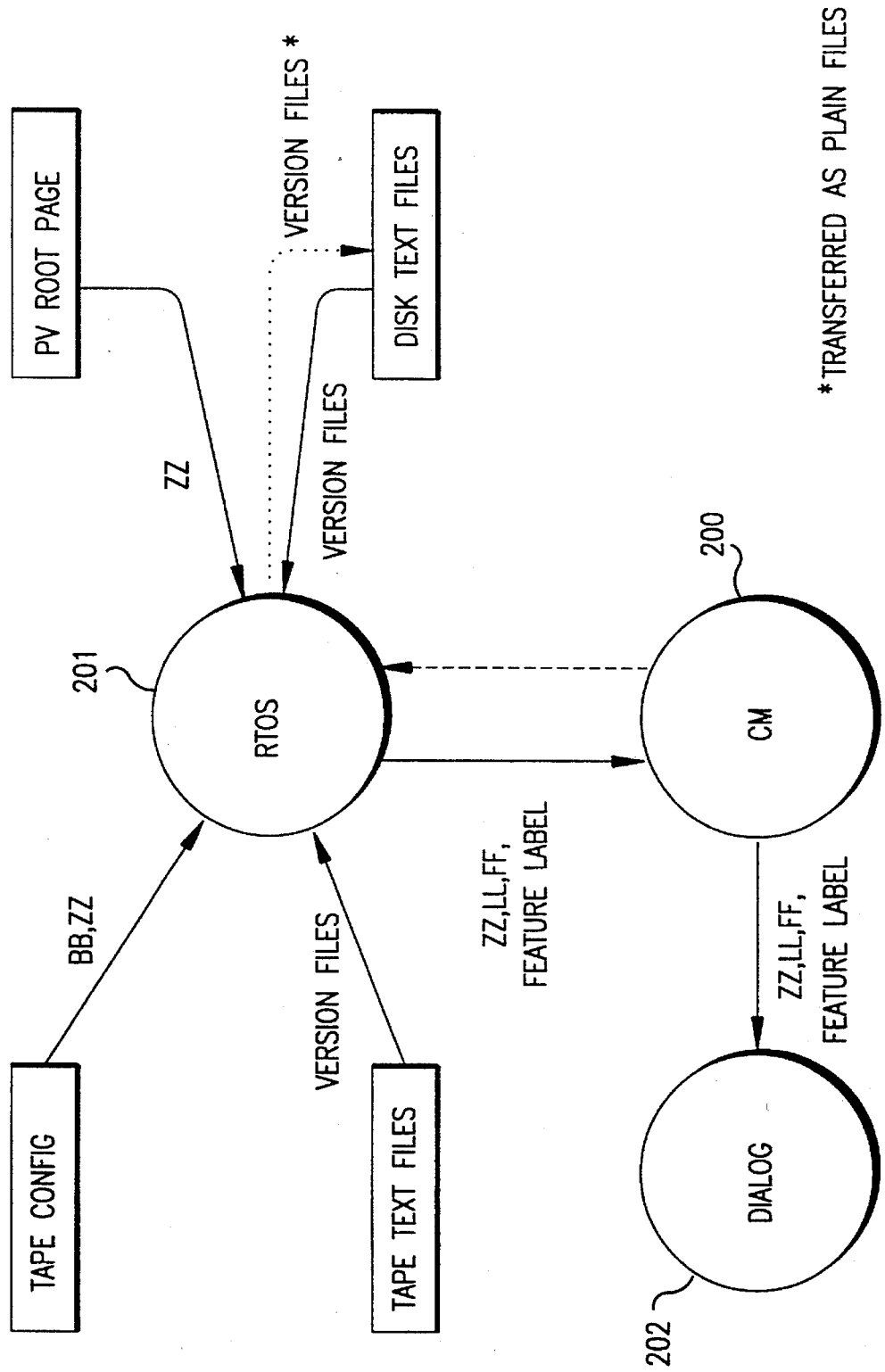
FIG. 6 is a representative high-level process flow diagram for a language upgrade to the data processing system illustrated in FIG. 3.
Figure 7:
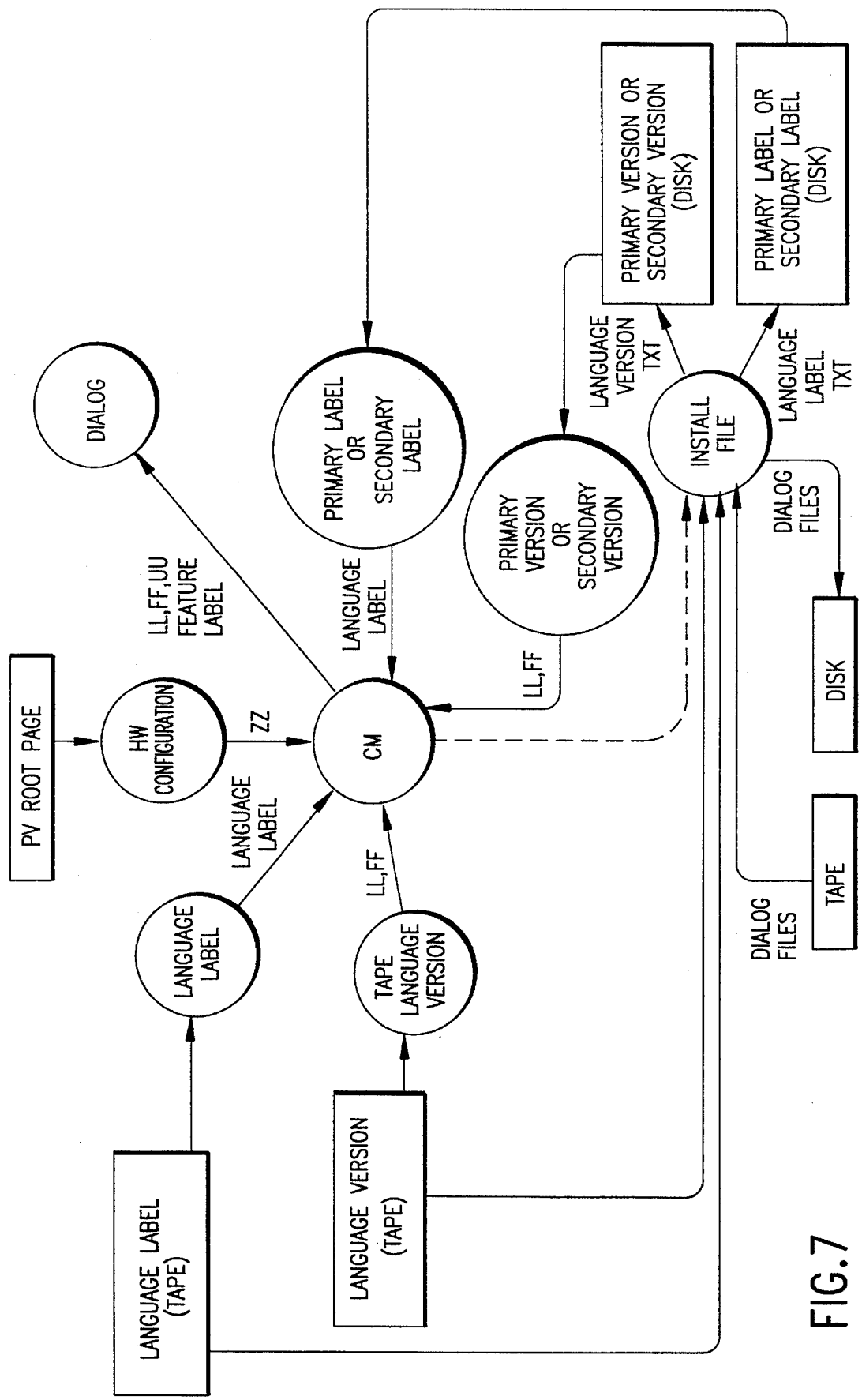
FIG. 7 is a data flow diagram for the CM application for a language upgrade.

FIGS. 6 and 7 illustrate a high-level process flow diagram and a data flow diagram for a language upgrade to the document production facility described in Example 1. FIG. 6 shows configuration data (ZZ, BB, LL, FF and text, identifying configuration relationships and inter-relationships) from PROMS, tape configuration and tape and disk application and data files Text (Tape Text and Disk Text). This data is processed by the Real Time Operating System (RTOS), 201, which in turn sends data to the CM application, 200. Upon completion of a language upgrade, CM delivers diagnostic information to Dialog and configuration data back to RTOS for system update (full language upgrade).

FIG. 7 is a detailed data flow diagram for CM application when performing a language upgrade to the document production system. As in Examples 1 and 2, control field data for the upgraded language is retrieved from LanguageLabel and LanguageVersion. Current component configuration control data ZZ is read from system data stores in HW Configuration from PV Root Page, and Primary and Secondary version from CPU disk storage. PV Root Page and current configuration language label and version control data (Language Label, LL and FF) are read from system storage data files on CPU A. This information is then used to determine subsequent upgrade processing. Upon confirmation that current configuration data and upgrade label and version data are consistent and the configuration integrity validated, InstaliFile transfers language files from tape to system disk storage, and updates current system version and label configuration data files on CPU A. Current configuration control version and label data is transferred to CM which provides diagnostic information to Dialog for interactive user viewing.

What is claimed is:

1. An automated process for managing a configuration and ensuring compatibility of components in a computing system, comprising the steps of:

identifying components of the system;

identifying an initial configuration of the components, comprising the steps of:

identifying at least two compatibility relationships, each compatibility relationship identified between at least two components and indicating at least one of an interfacing capability and a functional operability between the at least two components in the computing system, and identifying at least one compatibility inter-relationship, each compatibility inter-relationship identified between at least two of said compatibility relationships, or between one of said compatibility relationships and at least one of said components, the compatibility inter-relationships defining at least one of an interfacing capability and a functional operability between at least three components in the computing system;

sampling a current configuration of said components after at least one of the components is changed, the current configuration sampled in a manner similar to that of identifying an initial configuration;

comparing said current configuration to said initial configuration to obtain a validity result;

indicating one of a compatibility state and an incompatibility state based on said validity result; and taking corrective action when said indicating step indicates said incompatibility state and recording as said initial configuration said current configuration when said indicating step indicates said compatibility state.

2. The process according to claim 1, wherein the system components comprise at least one of hardware, software applications and software languages.

3. The process according to claim 2, wherein the comparing step occurs before at least one operation comprising at least one of a partial or complete system installation, partial or complete system downgrade and partial or complete system upgrade.

4. The process according to claim 3, wherein the comparing step occurs before and after the at least one system installation, downgrade or upgrade.

5. The process according to claim 2, wherein at least one of the hardware, software applications and software languages are selected from more than one version.

6. The process according to claim 5, wherein each corresponding version comprises at least one release.

7. The process according to claim 1, further comprising the step of writing data to a computer log for subsequent use in the comparing step.

8. An automated process for eliminating incompatibilities between resident software and migrational software in an automated computer system, comprising the steps of:

identifying software components comprising resident software and migrational software used in the automated computer system.

identifying compatibility relationships between at least two of said software components, each compatibility relationship defining at least one of an interfacing capability and a functional operability between the at least two of said software components;

identifying compatibility inter-relationships, each compatibility inter-relationship defining at least one of an interfacing capability and a functional operability between at least one of said compatibility relationships and at least one other of said compatibility relationships, or between one of said compatibility relationships and at least one of said software components;

assigning a dedicated control field to at least one of each of said compatibility relationships and said compatibility inter-relationships;

storing each of said dedicated control fields for subsequent retrieval;

sampling current configurations of said compatibility relationships and compatibility inter-relationships when a software component is changed, the sampling performed in a manner similar to that of identifying compatibility relationships and compatibility inter-relationships;

comparing said current configurations to said dedicated control fields;

indicating one of inconsistencies in compatibility and consistency in compatibility based on the comparison of said current configurations to said dedicated control fields; and automatically taking corrective action, including reverse migrating software, when inconsistencies in compatibility are indicated and recording said dedicated control fields as said current configurations when consistency in compatibility is indicated.

9. The process according to claim 8, further comprising the step of performing a computer operation that is at least one of an installation of migrational software or an upgrade or downgrade to resident software.

10. The process according to claim 8, further comprising the step of revalidating integrity of the computer system subsequent to performing a computer operation.

11. The process according to claim 8, wherein the step of automatically taking corrective action includes restoring the resident software on the automated computer system to a pre-operation configuration in response to an identified incompatibility.

* * * * *